(12) United States Patent
Millerd et al.

(10) Patent No.: US 7,079,251 B2
(45) Date of Patent: Jul. 18, 2006

(54) CALIBRATION AND ERROR CORRECTION IN MULTI-CHANNEL IMAGING

(75) Inventors: James E. Millerd, Aliso Viejo, CA (US); Neal J. Brock, Tucson, AZ (US); Larry Denneau, Jr., Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 259 days.

(21) Appl. No.: 10/687,308

(22) Filed: Oct. 16, 2003

(65) Prior Publication Data

US 2005/0083531 A1   Apr. 21, 2005

(51) Int. Cl.
G01B 9/02   (2006.01)
(52) U.S. Cl. ...................... 356/450; 356/491
(58) Field of Classification Search ............... 356/515, 356/512, 494, 491, 450
See application file for complete search history.

(56) References Cited

U.S. PATENT DOCUMENTS

| | | | |
|---|---|---|---|
| 4,141,652 A | * | 2/1979 | Feinleib ...................... 356/121 |
| 4,344,707 A | * | 8/1982 | Massie ........................ 356/521 |
| 4,399,356 A | * | 8/1983 | Feinleib et al. ........... 250/201.9 |
| 4,575,248 A | | 3/1986 | Horwitz et al. |
| 4,624,569 A | | 11/1986 | Kwon |
| 5,589,938 A | | 12/1996 | Deck |
| 5,663,793 A | | 9/1997 | de Groot |
| 5,777,741 A | | 7/1998 | Deck |
| 5,883,717 A | | 3/1999 | DiMarzio et al. |
| 5,926,283 A | | 7/1999 | Hopkins |
| 5,982,497 A | | 11/1999 | Hopkins |
| 6,249,289 B1 | | 6/2001 | Arnaud et al. |
| 6,304,330 B1 | * | 10/2001 | Millerd et al. ............... 356/521 |

OTHER PUBLICATIONS

L. G. Brown, "A Survey of Image Registration Techniques," Columbia University, Computer Science Department Publication, New York, NY, 1991.
R. C. Gonzalez et al., Digital Image Processing, Addison-Wesley, Reading, MA, 1987.
J. Schmit et al., "Extended averaging technique for derivation of error-compensating algorithms in phase-shifting interferometry," Applied Optics, vol. 34, p. 3610, Jul. 1995.
C. K. Hong et al., "Least-squares fitting of the phase map obtained in phase-shifting electronic speckle pattern interferometry," Optics Letters, vol. 20, p. 931, Apr. 1995.

(Continued)

Primary Examiner—Gregory J. Toatley, Jr.
Assistant Examiner—Marissa J. Detschel
(74) Attorney, Agent, or Firm—Antonio R. Duran

(57) ABSTRACT

A multi-channel imaging system is calibrated by measuring the geometric distortion in each sub-image, generating corresponding correction factors, and applying such factors to correct subsequent image data. In addition, intensity transfer-function arrays are measured at each pixel, and further used to correct for system and detector nonlinearities and nonuniformity between images. The procedure is repeated over a range of wavelengths to produce a complete set of correction coefficients and transfer functions. When the system is used for interferometric phase measurements, multiple measurements are preferably taken and a random phase offset in the reference path length is introduced at each measurement. The multiple phase data so derived are then averaged to reduce phase-dependent systematic measurement errors.

22 Claims, 5 Drawing Sheets

OTHER PUBLICATIONS

T. D. Upton et al., "Optical and electronic design of a calibrated multichannel electronic interferometer for quantitative flow visualization," Appl. Opt. vol. 34, No. 25, 19.
C. Koliopoulos et al., "Simultaneous phase shift interferometer," SPIE vol. 1531, pp. 119-127, 1991.

Schwider et al., Applied Optics, vol. 22, pp. 3421-3432, 1983).
Schmit et al., Applied Optics vol. 34, pp. 3610-3619, 1995.
M. F. Kuchel, "Advanced Interferometry at Carl Zeiss," Proceedings of SPIE, vol. 1720, p. 452-456 (1992).

* cited by examiner

Prior Art

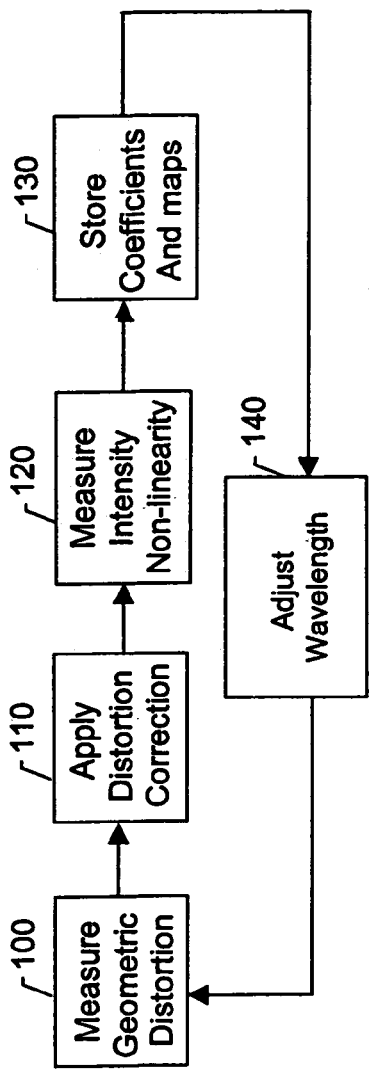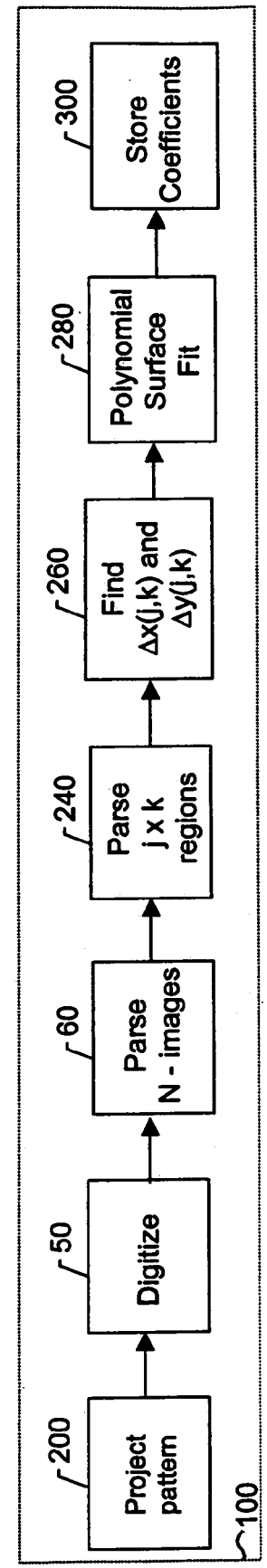
FIG 3
FIG 4

CALIBRATION AND ERROR CORRECTION IN MULTI-CHANNEL IMAGING

BACKGROUND OF THE INVENTION

1. Field of the Invention

The present invention relates to means for calibrating multi-channel imaging systems. In particular, the invention provides an approach for measuring and correcting the field-dependent image distortion, attenuation, and polarization rotation that may be present in multi-channel imaging systems to improve the accuracy of interferometric measurements of optical wavefronts.

2. Description of the Related Art

Multi-channel imaging systems can be used for the measurement of spectroscopic, polarimetric, and/or interferometric properties of objects by simultaneously acquiring a plurality of images on either single or multiple detector arrays. See, for example, U.S. Pat. Nos. 5,926,283, 5,982,497, 4,575,248, 5,589,938, 5,663,793, 5,777,741, 5,883,717, 4,624,569, and 6,304,330. Data from the multiple images can be used for qualitative comparison or can be combined in quantitative ways. In the case of polarimetry and interferometry, the data at each corresponding image pixel are combined through a mathematical algorithm to solve for a desired fundamental optical parameter (e.g., the optical path difference or the polarization state). The registration and losses between images can be extremely important to the accuracy of the calculation.

For ideal imaging systems, the registration between images can be accomplished through simple lateral shifting of the images digitized from the detector arrays. Thus, the registration can be expressed as a simple x and y offset for each image. However, even highly corrected real-world optical systems will contain field-dependent image distortion, which may not be perceptible to the human eye but can cause significant measurement errors. To mitigate these errors, it is first necessary to measure the image distortion and then to construct an algorithm to adjust the images and correct for the distortion. The prior art teaches methods for transforming images into alternate coordinate systems for computer graphics displays, but it is silent with respect to applying these algorithms to multi-channel imaging systems to improve measurement accuracy. See U.S. Pat. No. 6,249,289; L. G. Brown, "A Survey of Image Registration Techniques," Columbia University, Computer Science Department Publication, New York, N.Y., 1991; and R. C. Gonzalez et al., Digital Image Processing, Addison-Wesley, Reading, Mass., 1987.

Another problem that can greatly affect the accuracy of multi-channel imaging systems is the non-linear detector response between corresponding image pixels. This can be caused by electrically dead pixels on the detector array, non-linear electro-optical response, or obscuration due to contaminants such as dust or coating defects within the optical imaging system. The prior art describes methods for identifying phase-calculation algorithms that are robust with respect to non-linear detector response; however, these algorithms assume the same detector pixel is used for each phase-shifted image (see J. Schmit et al., "Extended averaging technique for derivation of error-compensating algorithms in phase-shifting interferometry," Applied Optics, Vol. 34, p. 3610, July 1995). The prior art describes methods for calculating data for bad or missing pixels by using nearest neighboring pixels; however, these also assume the same detector pixel is used for each phase-shifted image (see C. K. Hong et al., "Least-squares fitting of the phase map obtained in phase-shifting electronic speckle pattern interferometry," Optics Letters, Vol. 20, p.931, April 1995). Further, these algorithms reduce spatial resolution. In addition, prior-art methods for calibrating multi-channel interferometer systems describe methods for aligning the optical system to minimize registration errors between images but do not account for geometrical image distortion or pixel dependent non-linearities that may be present in the system, which can significantly limit accuracy. See T. D. Upton et al., "Optical and electronic design of a calibrated multi-channel electronic interferometer for quantitative flow visualization," Appl. Opt . . . Vol. 34, No. 25, 1995; and C. Koliopoulos et al., "Simultaneous phase shift interferometer," SPIE Vol. 1531, pp. 119–127, 1991.

Schwider et al. (Applied Optics, Vol. 22, pp. 3421–3432, 1983) and Schmit et. al. (Applied Optics Vol. 34, pp. 3610–3619, 1995) describe the use of extended averaging by introducing a know phase-shift between measurements to eliminate residual phase-dependent systematic error in conventional temporal phase-shifting interferometers. Multi-channel interferometers are typically employed in situations where the relative phase between the test and reference arms is unstable (e.g., due to vibration or turbulence). Therefore, introduction of a precise phase-shift between measurements is not possible, in general, and these methods are not adequate.

Schwider et. al. (Applied Optics, Vol 28, No. 18, pp. 3889–3892, 1989; and Applied Optics, Vol. 38, No. 4, pp. 655–659, 1999) also describe an a posteriori technique for calibrating errors in phase-shifting interferometers. This method requires the introduction of several tilt fringes, fitting the measured data to determine the phase-dependent error and then reprocessing the data to remove the error. In general, this method requires recalibration for every new tilt orientation and does not work for optical alignments near null-fringe condition where interferometers are typically operated to minimize wavefront error. Thus, a general method for the elimination of residual systematic errors in multi-channel interferometer systems is still needed and very desirable.

BRIEF SUMMARY OF THE INVENTION

In view of the aforementioned limitations of the prior art, it is one object of the present invention to provide a means for measuring the field-dependent image distortion in a multi-channel imaging system and a means for correcting subsequently measured images.

A further object of the invention is to provide a means for storing the image distortion information in a compact file format that can be rapidly recalled and applied to subsequent measurements.

A further object of the invention is to provide a means for detecting dead or obscured pixels in one image and approximating the value of such a pixel through the use of values measured at corresponding pixels in the other images.

A further object of the invention is to provide a means for measuring the relative photo-response of corresponding pixels in each image, storing coefficients, and applying a correction for normalizing the response of each pixel.

An additional objective of the invention is to provide a means for reducing phase-dependent systematic measurement error of interferometric phase measurements by averaging multiple measurements with random phase offsets of the reference path length.

In accordance with these objectives, the invention consists of measuring field-dependent geometric distortion for each image produced by the multi-channel system and calculating correction coefficients to remove the distortion from the measurement. According to one aspect of the invention, geometric distortion is determined by projecting a known pattern into the multi-channel imaging system and measuring the position of the pattern in each image with respect to a predetermined reference. Such measurement is accomplished by parsing each image into a plurality of regions with predetermined spatial coordinates, finding the absolute or relative offset of the known pattern in each region, and performing a polynomial surface fit of the pattern in each region to enable interpolation between region patterns. The polynomial coefficients are then stored and subsequently used to correct the measurement data. According to another approach, geometric distortion is measured using cross-correlation of the images with an arbitrary or a random calibration test pattern. This method only enables the relative correction between images, but it has the advantages of simplicity and low-cost implementation.

According to another embodiment of the invention, the light intensity distortion introduced by the system is also corrected by generating a light-intensity transfer function at each pixel and calculating coefficients for transfer arrays designed to normalize the system to produce a uniform response across each image and among images. This calibration procedure is carried out after geometric calibration and using measurement data already corrected for geometric distortion. The transform arrays are then applied to the measured intensities to generate uniform images.

According to yet another embodiment of the invention relevant to interferometric phase measurements, multiple phase measurements are taken and a random phase offset in the reference path length is introduced at each measurement. The multiple phase data so derived are then averaged to reduce phase-dependent systematic measurement errors.

Other objects, features, and advantages of the invention will become apparent to those skilled in the art from a consideration of the following detailed description taken in conjunction with the accompanying drawings.

BRIEF DESCRIPTION OF THE DRAWINGS

FIG. 3 is a block diagram of the method of the present invention for calibrating and correcting for errors in a multi-channel imaging system.

FIG. 4 is a diagram of the steps involved in determining image geometric distortion according to the invention.

DETAILED DESCRIPTION OF THE INVENTION

The present invention provides apparatus and methodology for quantifying and correcting for errors in multi-channel imaging systems. There are three primary types of errors that are addressed in this invention: 1) geometric errors, such as image distortion and registration; 2) deterministic errors, such as channel or pixel dependent attenuation; and 3) stochastic or multivariate errors, such as thermal noise or sensor smear. For the purposes of this disclosure, the term "geometric distortion" is used to refer to those errors that produce distortion and misalignments in the images produced by the multi-channel system. The term "intensity distortion" is used to refer to nonuniformity of intensity detection resulting from attenuation along the optical path, and detector nonlinearity or nonuniformity of response.

Figure 1:
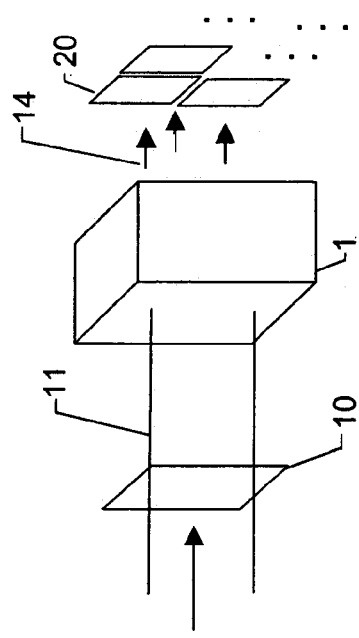
FIG. 1 is a schematic view of a generic multi-channel imaging system.

Turning to the drawings, a generic multi-channel imaging system is shown in FIG. 1. The system consists of an image splitting element 1 that produces a plurality of image copies 20 from an input image 10. The multi-channel imaging system can also be thought of as dividing an incoming wavefront 11 into a plurality of wavefront copies 14. The positions of the input image 10 and the image copies 20 are defined to be at conjugate image planes. The image copies 20 or wavefront copies 14 can be detected by a single or by multiple pixilated detector arrays.

Figure 2:
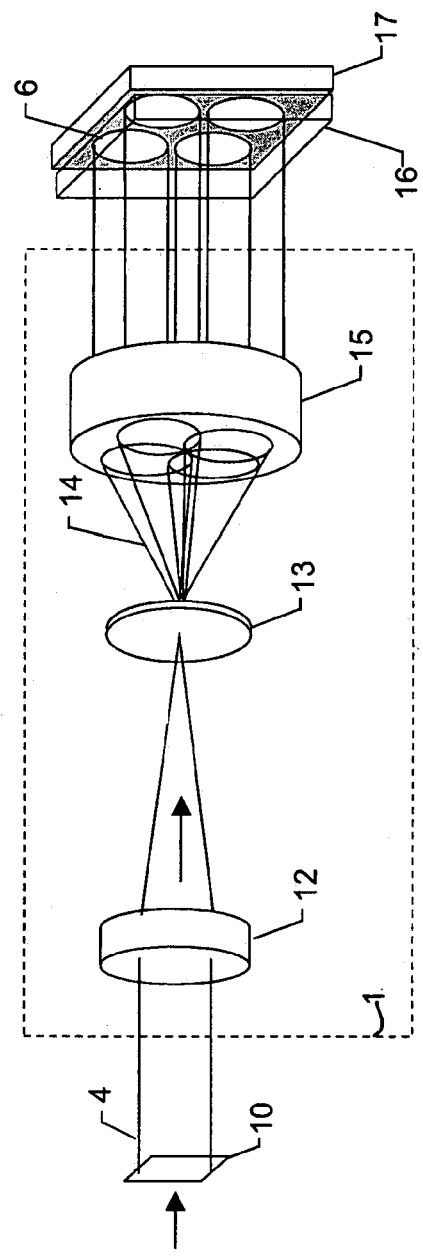
FIG. 2 is a schematic view of a multi-channel imaging system according to the prior art.

FIG. 2 illustrates a prior art multi-channel imaging system used for measuring the phase difference between two substantially collinear, orthogonally polarized beams combined into an input wavefront 4. An input lens 12 focuses the orthogonally polarized beams onto a diffractive optical element 13 that produces a plurality of sub-wavefronts 14, which are then further imaged by an output lens 15 onto a single detector array 17. A polarization phase plate 16 imparts different relative phase-shifts between the two orthogonally polarized beams and generates a plurality of phase-shifted interferograms 6. Geometric image distortion, polarization rotation, and intensity non-uniformity can be introduced by the output lens 15, the polarization phase plate 16, and the detector array 17. As is well understood in the art, the common path elements, such as the input lens 12 and the diffractive element 13, can also introduce geometric distortion common to all images, as well as non-common distortion and intensity non-uniformity, if the orthogonally polarized beams deviate from being exactly collinear.

The prior-art example shown in FIG. 2 is intended to exemplify how the image splitting element 1 of FIG. 1 is a combination of common path and non-common path elements that can introduce geometric distortion, polarization rotation, phase errors and intensity non-uniformity into the sub-images 20. The subject of the present invention is a method for calibrating these types of errors and compensating for them during subsequent measurements.

FIG. 3 illustrates the broad steps followed by the method of the invention for quantifying error sources in a multi-channel measurement. A first stage 100 consists of measuring field-dependent geometric distortion, followed by a second stage 110 during which such field-dependent geometric distortion is applied to correct subsequent images, a third stage 120 during which the light intensity transfer function is measured at each pixel, and finally a fourth stage 130 wherein the coefficients so generated are saved. An additional stage 140 is illustrated to indicate that the entire procedure is preferably repeated over a range of wavelengths.

FIG. 4 illustrates the steps involved in stage 100 of the invention for quantifying and storing the image distortion present in the system. The first step 200 in the process is to project a pattern into the multi-channel imaging system. The pattern can be self-illuminated (e.g., light emitting diodes), back illuminated (e.g., light source and transparency), or front reflected (e.g., a light source and a reflective pattern). A known pattern can be used to achieve absolute distortion correction, or a random, unknown pattern can be used to achieve relative alignment between the sub-images. For many real-world optical systems, the relative alignment of images is the most significant correction needed to improve measurement accuracy because the absolute geometric distortion is acceptably small for comparison with the real world object. One example of this is found in interferometric systems measuring strain on diffuse reflecting surfaces. The phase of an optical beam reflected from a diffuse surface varies rapidly with spatial position; therefore, the images must be accurately registered with respect to each other. However, the rapidly varying phase is subtracted out in subsequent measurements and only a slowly varying change in the surface height is measured. Because the measured quantity varies slowly with spatial position, the absolute geometrical distortion of the image may present an acceptably low error when comparing the results with other spatial data, such as a computer generated finite element model.

In step 50, the calibration pattern is detected and digitized, for example by a CCD camera, a frame grabber, and a computer. The resulting images are then digitally parsed into N sub-images in step 60. The process of detection and parsing is described in the prior art. For example, in the prior-art example shown in FIG. 2, there are 4 sub-images.

As shown in FIG. 4, the process followed for quantifying and storing the image distortion present in the system further includes steps 240, 260, and 280, respectively, for parsing the N sub-images into j×k sub-regions where each sub-region has a center spatial coordinate given by $x_j, y_k$; finding the absolute or relative offset of the pattern in each sub-region $\Delta x_{N,j,k}$ and $\Delta y_{N,j,k}$; and performing a polynomial surface fit such that $$\Delta x_{N,\lambda}(x_{j,k}, y_{j,k}) = \sum_{n,m} c_{N,\lambda,n,m} x_{j,k}^n y_{j,k}^m \text{ and} \quad (1)$$

$$\Delta y_{N,\lambda}(x_{j,k}, y_{j,k}) = \sum_{n,m} d_{N,\lambda,n,m} x_{j,k}^n y_{j,k}^m \quad (2)$$

where $c_{N,\lambda,n,m}$ and $d_{N,\lambda,m,n}$ are coefficients of the smooth polynomial functions obtained in the fit. The subscript λ denotes that the calibration may be performed at a plurality of wavelengths. The coefficients are then stored in step 300 and can be subsequently recalled and used for the correction of measurement data during the correction stage 110. The order of the polynomial functions and thus the number of coefficients can be adjusted in conventional manner as needed to obtain a good fit.

Figure 5A:
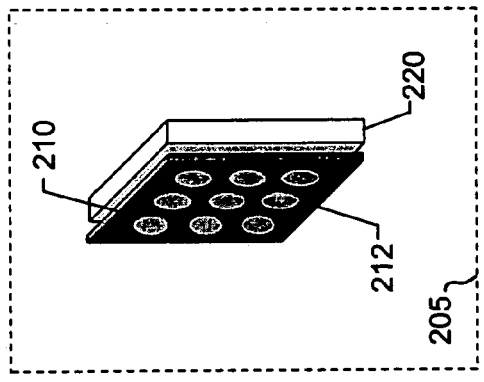
FIG. 5a is a schematic view of an exemplary apparatus for producing a calibration pattern.

FIG. 5a illustrates a calibration device 205 that can be used to produce a calibration image suitable for both absolute and relative image correction. The device consists of a substrate 220, which can be either transparent or coated with a reflective coating, with a mask pattern 210 that could be a self-supported structure such as a thin metal or ceramic substrate patterned with repeated regions 212 of arbitrary shape. The mask pattern 210 can also be an integrated structure or coating such as an organic or inorganic thin-film deposited directly on the substrate 220 in such a way as to produce reflective or absorptive repeated regions 212 of arbitrary shape. For simplicity, only 9 repeated regions are shown in FIG. 5a, but any number of repeated regions may be used as necessary to adequately characterize the multi-channel system. For typical commercial arrays of 1000× 1000 pixels and a relative system distortion of about 0.5%, a 20×20 pattern can provide adequate sub-pixel resolution, although more points will typically lead to better correction. To produce the calibration pattern, the calibration device 205 is illuminated with a light source and either transmitted through the device or reflected from the surface. In either case, the illumination source should be arranged so that the light incident on the multi-channel imaging system is at substantially the same angle that will be used under actual measurement conditions.

Figure 5B:
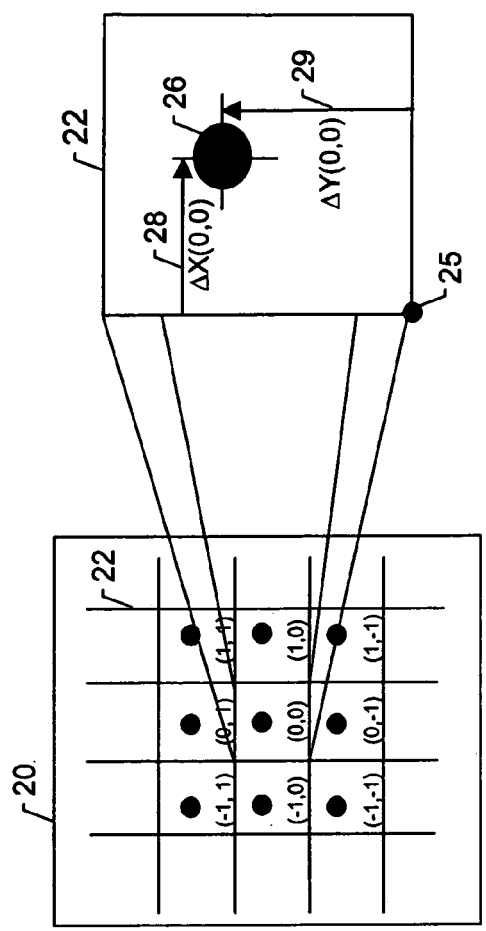
FIG. 5b is a schematic view of an exemplary pattern and coordinates used to determine image distortion.

FIG. 5b illustrates how a sub-image 20 produced using the calibration device 205 of FIG. 5a is further analyzed according to the invention. The sub-image 20 comprises repeated features 26 that may be either a bright spot surrounded by a dark background or a dark spot surrounded by a bright background. The shape of the spot(s) may be important depending on the algorithm used, as described below. The sub-image is then sub-divided into j by k sub-regions 22 such that each region contains one or many of the repeated features 26. The location of the repeated features 26 within each sub-region 22 is then determined using one of several methods described below. The location is defined by a set of x and y coordinates 28 and 29, respectively, that are referenced to a consistent origin point 25 within each sub-region 22. For example, the x and y coordinates 28 and 29 could be referenced to an origin point 25 located in the lower left-hand corner of each sub-region 22, as illustrated in FIG. 5b.

Several methods can be employed to determine the location of the repeated features 26. One is the use of a simple peak-finding routine to locate the brightest or darkest region in the sub-image. This requires that one repeated feature 26 be present in each sub-region 24. In a preferred embodiment of the invention, a centroid calculation is used, which is analogous to finding the center of mass within the region. This method can produce a more accurate result than the peak-finding method and it is permissible to have more than one repeated feature 26 within each sub-region 22. Each pixel's weight is the product of its relative x and y coordinates 28 and 29 and the intensity value recorded at the pixel. The centroid is then found by summing the products over all pixels and dividing the sum by the width of the region. Mathematically this can be expressed by, $$\Delta X_{N,\lambda,j,k} = \frac{\sum_{x,y \in region} (x - x_{j,k}) I_{N,\lambda}(x, y)}{widthx} \text{ and} \quad (3)$$

$$\Delta Y_{N,\lambda,j,k} = \frac{\sum_{x,y \in region} (y - y_{j,k}) I_{N,\lambda}(x, y)}{widthy}, \quad (4)$$

where widthx and widthy are the width of each region along x and y, respectively, and $I_{N,\lambda}(x, y)$ is the measured intensity value at each x,y pixel, in each sub-region N, and at each wavelength λ.

An additional step that can be used to further-improve the accuracy of determining the location of the repeated features 26 involves the use of a cross-correlation algorithm. In this case each sub-region is first cross-correlated with a master sub-region image according to the following formula:

$$I'_{N,\lambda,j,k}(x, y) = \sum_m \sum_n I_{master}(m, n) I_{N,\lambda,j,k}(x - m, y - n) \quad (5)$$

The master image can be taken from one of the sub images (relative correction) or can be synthesized from an ideal image (absolute correction). The additional subscripts, i and j, for the intensity values denote the fact that the cross-correlation is performed separately for each sub-region of the image and not for the entire image at once. The resulting operation produces a unique correlation peak in each sub-region of each sub-image.

A centroid or peak-finding algorithm can then be applied to find the center for each sub-region of each sub-image. This method can produce excellent results even when there is significant noise present in the images and when there is significant distortion within the cell.

Figure 6:
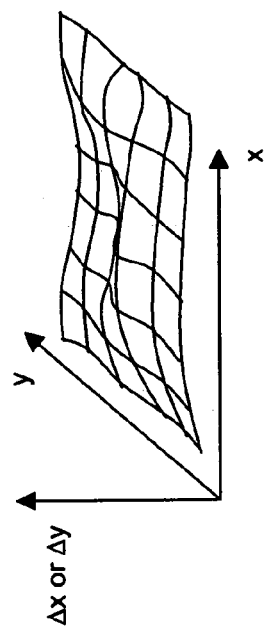
FIG. 6 is a schematic view of a surface used to visualize the distortion of each image.

Another approach suitable for the invention is to use a cross-correlation method with an unknown or random calibration test pattern. With this method it is only possible to determine the relative correction between images and not an absolute calibration, but it has the advantage of working with a very simple, low cost target, for example a diffuse reflector or a ground glass transmission plate. One of the N sub-images is selected as the target or master image. Each sub-region from the master cell is cross-correlated with corresponding cells from the other sub-images and a relative offset is determined. The other sub-images will be re-mapped to correspond to the chosen sub-image. This method is particularly useful when the overall distortion of the master image is low. FIG. 6 illustrates a 3-dimensional visualization of the error functions $\Delta x_N$ or $\Delta y_N$ for an arbitrary optical system.

Figure 7:
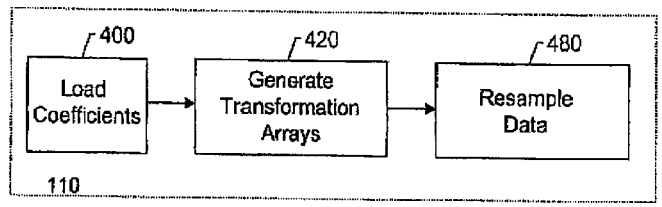
FIG. 7 is a diagram of the steps involved in correcting for image distortion.

FIG. 7 shows the steps used in stage 110 to generate a correction map and apply it to subsequent data measurements. The stored coefficients are loaded in step 400 and transformation arrays are generated in a subsequent step 420 using the equations:

$$\Delta x_{N,\lambda}(x, y) = \sum_{n,m} c_{N,\lambda,n,m} x^n y^m \text{ and} \quad (6)$$

$$\Delta y_{N,\lambda}(x, y) = \sum_{n,m} d_{N,\lambda,n,m} x^n y^m \quad (7)$$

The transform arrays can be pre-calculated to save processing time during the subsequent step 480 of correcting new data for distortion, which may be repeated multiple times, once for each new measurement. The distortion correction of step 480 consists of interpolating a corrected data array from the raw input data array. A simple interpolation routine may be used, know as a bi-linear transform, which consists of finding the four nearest neighbor data points for each point in the original array and using a linear weighting to find the transformed value. Greater accuracy can be obtained using a higher order interpolation routine, such as a bi-cubic interpolation, which applies a piecewise polynomial function to a 4×4 neighborhood of nearby points.

The use of smoothly varying functions permits correction factors to be quickly calculated at any point in the field even though only several points were used to measure it. By selecting the polynomial order, the accuracy of the fit operation can be balanced against the spatial frequency response to mitigate the effects of random noise present in the measured data. For example, for many real-world cases a third-order fit produces an adequate balance between noise suppression and adequate spatial resolution.

Figure 8:
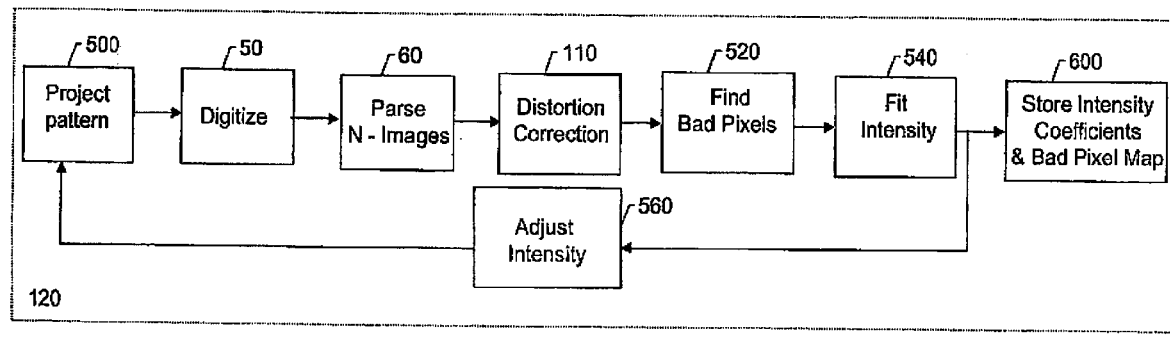
FIG. 8 is a diagram of the steps involved in measuring intensity non-linearity in the sub-images.

FIG. 8 illustrates the stage 120 of measuring the deterministic systematic errors. It comprises the step 500 of projecting a pattern, which could be either a uniform or "flat field" pattern or a spatially non-uniform pattern such as a sinusoidal intensity map. The incident pattern is digitized in step 50, parsed in step 60 and then subjected to the distortion correction algorithm of step 110 to resample the data. The image data are then processed by a threshold detection algorithm to identify bad pixels in step 520 and the intensity is used to fit coefficients of a single valued equation in step 540. An example of a simple linear fit is given by:

$$I'_N(x,y) = G_N(x,y) I_N(x,y) + O_N(x,y), \quad (8)$$

where $G_N$ and $O_N$ are coefficients that quantify the relative gain and offset corrections necessary for each pixel. The coefficients are determined such that $$I'_1(x,y) = I'_2(x,y) = I'_3(x,y) = I'_4(x,y). \quad (9)$$

The input intensity is adjusted 560 and the loop is repeated until the coefficients converge to steady values. Once the values converge the intensity normalization coefficients and bad pixel maps are stored in step 600 for subsequent recall and use.

Figure 9:
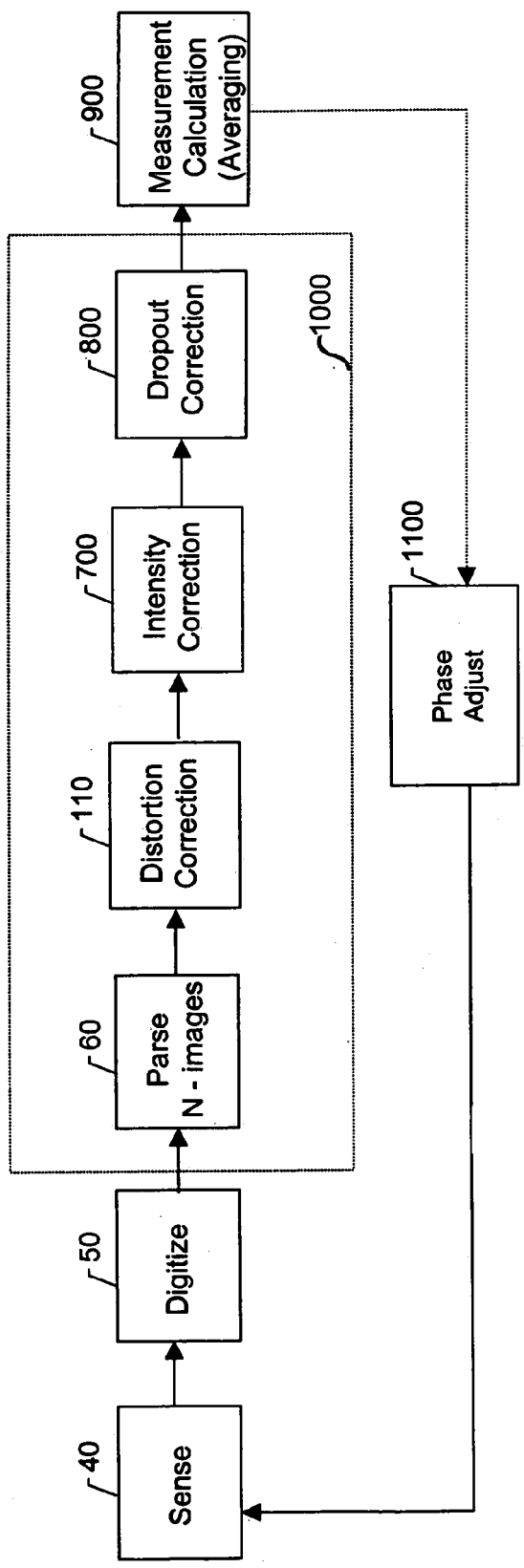
FIG. 9 is a diagram of the steps involved in correcting for image geometric distortion and intensity errors in a multi-channel imaging system.

FIG. 9 illustrates the approach of the invention to improve measurement accuracy after the calibration procedure is performed. The measurement is sensed by the detector array in a first step 40, digitized in step 50, parsed into N sub-images in step 60, resampled to correct for geometric distortion in step 110, corrected for intensity non-linearity in step 700, corrected at bad pixels in step 800, and finally passed onto the actual measurement calculation in step 900. The actual process of image calibration, indicated by reference numeral 1000 in the figure, does not necessarily need to be performed in a sequential fashion. That is, the steps can be combined into an efficient loop that only passes over each sub-image array a single time and performs the necessary calculations at each pixel.

Bad pixels can also be corrected simply by setting a flag or code in the data to identify them as such and drop them from the calculation. However, for some systems it is possible to reconstruct the bad or missing data from the corresponding pixels in the other sub-images. For example, in the case of four sub-images, this can be modeled by the relations:

$$I'_1(x,y) = f_1(I'_3(x,y), I'_2(x,y), I'_4(x,y))$$

$$I'_2(x,y) = f_2(I'_4(x,y), I'_3(x,y), I'_1(x,y))$$

$$I'_3(x,y) = f_3(I'_1(x,y), I'_4(x,y), I'_2(x,y))$$

$$I'_4(x,y) = f_4(I'_2(x,y), I'_{11}(x, y), I'_3(x,y))$$

where $f_n$ is a function that depends on the physical quantity that is measured. The advantage of reconstructing missing data from good data in corresponding sub-images is that the data can be processed with the downstream algorithm without passing of invalid data flags, which can slow processing or may not be handled by commercially available routines. In addition, data from all the sub-images can be displayed as contiguous.

For example, for the case of simultaneous phase-shifting interferometry, where each sub-image is an interferogram phase-shifted by 90 degrees, the functions $f_n$ are identical and given by:

$$I'_1(x,y)=I'_2(x,y)+I'_4(x,y)-I'_3(x,y)$$

$$I'_2(x,y)=I'_1(x,y)+I'_3(x,y)-I'_4(x,y)$$

$$I'_3(x,y)=I'_2(x,y)+I'_4(x,y)-I'_1(x,y)$$

$$I'_4(x,y)I'_1(x,y)+I'_3(x,y)-I'_2(x,y)$$

Both geometric distortion and intensity distortion in a system may be strongly dependent on the illumination wavelength. These chromatic effects can be removed from the system by making calibration measurements at multiple wavelengths (as indicated by step 140 in FIG. 3) and subsequently recalling the proper calibration file as a function of operational wavelength for use for image calibration (see reference numeral 1000 in FIG. 9). The calibration coefficients can be interpolated to find a "best approximation" for a wavelength where a calibration procedure was not performed.

Even after careful calibration, measurement errors will exist due to stochastic and multivariate error sources. For example, thermal noise in the electronics produces a random error signal. According to yet another aspect of the invention, it is found that true random error sources can be reduced through averaging multiple measurements. Multivariate error sources are more problematic and, in general, cannot be reduced by averaging. One example of a multivariate error source that can cause problems when using a CCD camera is sensor smear, which results from light leakage into the vertical shift registers as a charge packet is clocked though a brightly illuminated region of the sensor. For interferometric sensors, smear can cause a phase-dependent error signal that also depends on the absolute intensity, fringe frequency and orientation. Thus, it is not feasible to perform an a priori calibration for this type of error. However, because the error source manifests itself as a periodic function in a controllable variable, it is possible to induce a random nature to the error.

In an interferometer, for example, the error can be randomized by shifting the phase offset between measurements. Averaging can then be used to reduce the error source, similar to stochastic noise. The measured phase of the interferometer can be expressed by $$\phi_{meas}=\phi_{abs}+\epsilon(\phi_{abs}), \quad (10)$$

where $\phi_{abs}$ is the absolute phase difference between the reference and test beams, and $\epsilon$ is the measurement error which depends explicitly on the absolute phase. The absolute phase difference can be split into an offset phase $\phi_{off}$ that is constant over the surface and a spatially varying phase $\phi_{spatial}$ according to $$\phi_{abs}(x,y)=\phi_{spatial}(x,y)+\phi_{off}, \quad (11)$$

so that $$\varepsilon(\phi_{spatial}(x,y)+\phi_{off})=\sum_n a_n\cos(n(\phi_{spatial}(x,y)+\phi_{off}))+ \quad (13)$$
$$\sin(n(\phi_{spatial}(x,y)+\phi_{off})),$$

The periodic error signal can be represented by an expansion series about the phase, $$\epsilon(\phi_{spatial}(x,y)+\phi_{off})\Sigma_n a_n \cos(n(\phi_{spatial}(x,y)+\phi_{off}))+b_n \sin(n(\phi_{spatial}(x,y)+\phi_{off})), \quad (13)$$

where $a_n$ and $b_n$ are coefficients that may be generated on the basis of various factors such as smear, channel loss, etc. The subscript n corresponds to a harmonic of the fundamental frequency.

For a static system, one without any phase drift or vibration, it is possible to introduce systematic phase delays and solve for the coefficients, $a_n$ and $b_n$, using a least square fitting; however, measurements of practical interest for multi-channel systems are characterized by significant vibration and phase drift. It is also possible to fit the coefficients from a single interferogram provided sufficient phase periods (or fringes) are present (Schwider et. al.). However, the multivariate nature of the coefficients, that is, their dependence on multiple factors, such as intensity level and fringe orientation, makes it necessary to repeat the fitting process for every measurement. In addition, the process does not work for null-fringe conditions, which is of considerable practical importance.

According to the invention, multiple measurements taken with a random phase offset between each measurement are averaged, as indicated by steps 900 and 1100 in FIG. 9. The final averaged phase at each surface coordinate x,y is given by $$\phi_{ave}(x,y) = \frac{1}{N}\sum_{m=0}^{N} \phi_{meas}(x,y)\bigg|_{\phi_{off}=\phi_m}, \quad (14)$$

where $\phi_m$ is a random phase offset with uniform distribution between 0 and $2\pi$. Both the phase offset and the periodic measurement error average to a constant value for all pixels. That is, $$\frac{1}{N}\sum_{m=0}^{N}[\phi_m+\varepsilon(\phi_{spatial}(x,y)+\phi_m)]=\pi+|\varepsilon|=\text{const}, \quad (15)$$

where $|\epsilon|$ is a constant value proportional to the magnitude of the periodic measurement error. Therefore, the resulting averaged measurement is given by, $$\phi_{ave}(x,y)=\phi_{spatial}(x,y)+ \text{const.} \quad (16)$$

The constant value can easily be determined through spatial averaging of the data. The constant value can be subtracted to recover only the spatially varying phase, which is typically the measurement of interest. The periodic error is reduced by one over the square root of the sample size $(1/\sqrt{N})$, as is the stochastic noise. The method works for all fringe orientations and even in the presence of external periodic phase perturbations and phase drift. Therefore, it presents a robust solution for all potential situations.

In order to introduce the phase offset, the reference or test optic can be mounted on a linear transducer to introduce a path-length delay equal to or greater than one wavelength. Equivalently, an electro-optic device can be inserted into the path of the reference or test beams to introduce the variable path length delay. Care must be taken to ensure that the phase offset is uniform across all pixels.

There are several ways to achieve a random phase offset distributed evenly over all phase values. In one embodiment the data sampling is set at a constant interval and a random phase offset is introduced temporally. A second, preferred, embodiment uses a random sampling interval while the phase offset is ramped with a constant period. This method is very easy to achieve in practice since computers can easily generate an arbitrarily long sequence of random numbers with a uniform distribution to be used as a sampling delay. Similarly, a fixed frequency electronic ramp signal is also straightforward to produce.

In a third embodiment, both the phase offset and sampling interval are periodic; however, the two intervals are adjusted to be different from each other, and preferably non-integer multiples. The phase offset may be driven with sinusoidal excitation or, preferably, with a linear ramp. This method produces, quasi-random phase-offsets; however, it can produce an acceptable approximation and adequate reduction in the error signal for some applications. The advantage of this embodiment is it's simple implementation.

Figure 10:
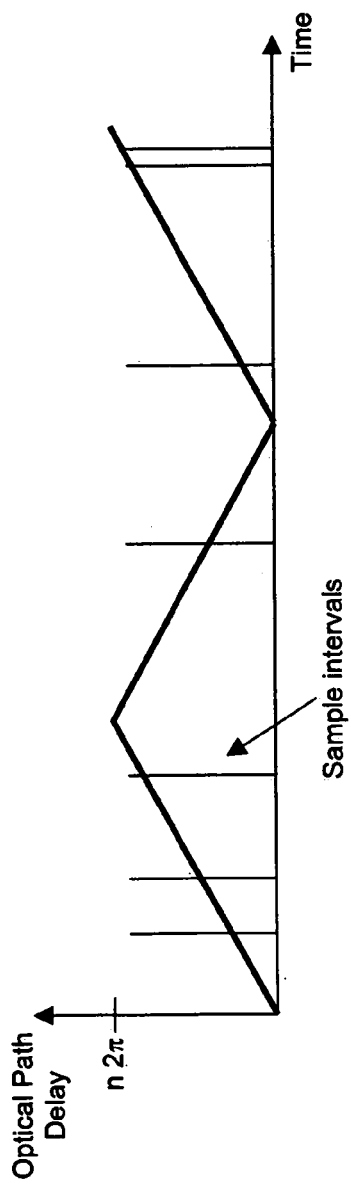
FIG. 10 is an example of phase offsets and sampling periods used to reduce systematic measurement errors in interferometric phase measurements.

An example of the phase offset and sampling periods for the preferred embodiment is shown in FIG. 10. The ramp function should be adjusted to introduce an optical path-length difference of (n $2\pi$), where n is an integer. The computer is used to generate a series of random delays having a uniform distribution over the ramp period. Other combinations of phase-shift waveforms and sampling frequencies can be employed in order to affect a uniform probability distribution between 0 and $2\pi$ phase offset.

Those skilled in the art will understand that the preceding exemplary embodiments of the invention provide the foundation for numerous alternatives and modifications thereto. These other modifications are also within the scope of the invention, which is accordingly not to be limited to the embodiments precisely shown and described above.

What is claimed is:

1. A method of correcting measurement data obtained from a multi-channel imaging system, comprising the steps of:
    a) producing a sub-image in each channel of the system using a predetermined wavelength;
    b) dividing each sub-image produced by the system into a plurality of sub-regions;
    c) measuring a geometric distortion introduced by the system in each sub-region of each sub-image by measuring a spatial displacement with respect to a predetermined reference position of an image feature in each sub-region of each sub-image produced by the system using a cross-correlation algorithm for each sub-region of each sub-image;
    d) determining a correction factor corresponding to said geometric distortion introduced by the system in each sub-region of each sub-image by calculating correction factors as required to negate said spatial displacement in each sub-region of each sub-image produced by the system;
    e) using said correction factor for each sub-region of each sub-image to establish a correction coefficient for each sub-image pixel and to produce a corresponding geometric correction matrix for each sub-image; and
    f) applying said geometric correction matrix to remove geometric distortion from measurement sub-images produced by the system.

2. The method of claim 1, wherein a surface equation is fit through said correction factors and said correction coefficient is obtained from the surface equation.

3. The method of claim 2, wherein said surface equation is a polynomial.

4. A method of correcting measurement data obtained from a multi-channel imaging system, comprising the steps of:
    a) producing a sub-image in each channel of the system using a predetermined wavelength;
    b) measuring a geometric distortion introduced by the system in each sub-image;
    c) determining a geometric correction matrix corresponding to said geometric distortion introduced by the system in each sub-image; and
    d) applying said geometric correction matrix to remove geometric distortion from measurement sub-images produced by the system;
    wherein said geometric distortion is measured using one of said sub-images as a reference.

5. The method of claim 4, further including the step of repeating steps (a) through (c) using a different wavelength prior to carrying out step (d).

6. A method of correcting measurement data obtained from a multi-channel imaging system, comprising the steps of:
    producing a sub-image in each channel of the system using a predetermined wavelength;
    measuring a geometric distortion introduced by the system in each sub-image;
    determining a geometric correction matrix corresponding to said geometric distortion introduced by the system in each sub-image;
    measuring an intensity distortion introduced by the system in a plurality of pixels in each sub-image;
    determining a transfer-function correction matrix to produce a uniform intensity response across each of said plurality of pixels;
    applying said transfer-function correction matrix to remove intensity distortion from measurement sub-images produced by the system; and
    applying said geometric correction matrix to remove geometric distortion from measurement sub-images produced by the system.

7. A method of correcting measurement data obtained from a multi-channel imaging system, comprising the steps of:
    a) producing a sub-image in each channel of the system using a predetermined wavelength;
    b) dividing each sub-image produced by the system into a plurality of sub-regions;
    c) measuring a geometric distortion introduced by the system in each sub-region of each sub-image;
    d) determining a correction factor corresponding to said geometric distortion introduced by the system in each sub-region of each sub-image; and
    e) using said correction factor for each sub-region of each sub-image to establish a correction coefficient for each sub-image pixel and to produce a corresponding geometric correction matrix for each sub-image;
    f) measuring an intensity distortion introduced by the system in a plurality of pixels in each sub-region of said sub-image;
    g) determining a transfer-function correction matrix to produce a uniform intensity response across each of said plurality of pixels in each sub-region of said sub-image;
    h) applying said transfer-function correction matrix to remove intensity distortion from measurement sub-images produced by the system; and i) applying said geometric correction matrix to remove geometric distortion from measurement sub-images produced by the system.

8. The system of claim 4, wherein said measuring means includes:
   means for dividing each sub-image produced by the system into a plurality of sub-regions;
   means for measuring a geometric distortion introduced by the system in each sub-region of each sub-image;
   means for determining a correction factor corresponding to said geometric distortion introduced by the system in each sub-region of each sub-image; and
   means for using said correction factor for each sub-region of each sub-image to establish a correction coefficient for each sub-image pixel and to produce a corresponding correction matrix for each sub-image.

9. The system of claim 8, wherein said measuring means further includes means for measuring a spatial displacement with respect to a predetermined reference position of an image feature in each sub-region of each sub-image produced by the system; and said determining means includes means for calculating correction factors as required to negate said spatial displacement in each sub-region of each sub-image produced by the system.

10. The system of claim 4, further including means for fitting a surface equation through said correction factors and for obtaining said correction coefficient from the surface equation.

11. The system of claim 10, wherein said surface equation is a polynomial.

12. A multi-channel imaging system, comprising:
   a) means for producing a sub-image in each channel of the system using a predetermined wavelength;
   b) means for measuring a geometric distortion introduced by the system in each sub-image;
   c) means for determining a geometric correction matrix corresponding to said geometric distortion introduced by the system in each sub-image; and
   d) means for applying said geometric correction matrix to remove geometric distortion from measurement sub-images produced by the system;
   wherein said means for measuring said geometric distortion utilizes one of said sub-images as a reference.

13. The system of claim 4, further including means for changing said wavelength.

14. A multi-channel imagine system, comprising:
   means for producing a sub-image in each channel of the system using a predetermined wavelength;
   means for measuring a geometric distortion introduced by the system in each sub-image;
   means for determining a geometric correction matrix corresponding to said geometric distortion introduced by the system in each sub-image;
   means for applying said geometric correction matrix to remove geometric distortion from measurement sub-images produced by the system;
   means for measuring an intensity distortion introduced by the system in a plurality of pixels in each sub-image;
   means for determining a transfer-function correction matrix to produce a uniform intensity response across each of said plurality of pixels; and
   means for applying said transfer-function correction matrix to remove intensity distortion from measurement sub-images produced by the system.

15. A multi-channel imaging system, comprising:
   means for producing a sub-image in each channel of the system using a predetermined wavelength;
   means for dividing each sub-images produced by the system into a plurality of sub-regions;
   means for measuring a geometric distortion introduced by the system in each sub-region of each sub-image;
   means for determining a correction factor corresponding to said geometric distortion introduced by the system in each sub-region of each sub-image;
   means for using said correction factor for each sub-region of each sub-image to establish a correction coefficient for each sub-image pixel to produce a corresponding correction matrix for each sub-image;
   means for measuring an intensity distortion introduced by the system in a plurality of pixels in each sub-region of said sub-image;
   means for determining a transfer-function correction matrix to produce a uniform intensity response across each of said plurality of pixels in each sub-region of said sub-image;
   means for applying said transfer-function correction matrix to remove intensity distortion from measurement sub-images produced by the system; and
   means for applying said geometric correction matrix to remove geometric distortion from measurement sub-images produced by the system.

16. A method of correcting measurement phase data obtained from a multi-channel interferometric imaging system, comprising the steps of:
   a) producing a set of sub-images, each sub-image in said set corresponding to a channel of the system;
   b) calculating a phase map from said set of sub-images;
   c) repeating steps (a) and (b) a plurality of times, each time introducing a phase offset in said set of sub-images, thereby producing a plurality of additional phase maps;
   d) averaging said phase map and said additional plurality of phase maps to produce a corrected phase map.

17. The method of claim 16, wherein said phase offset is random.

18. The method of claim 16, wherein said phase offset is introduced in a reference path length.

19. The method of claim 1, further including the following steps:
   measuring an intensity distortion introduced by the system in a plurality of pixels in each sub-image;
   determining a transfer-function correction matrix to produce a uniform intensity response across each of said plurality of pixels; and
   applying said transfer-function correction matrix to remove intensity distortion from measurement sub-images produced by the system.

20. The method of claim 4, further including the following steps:
   measuring an intensity distortion introduced by the system in a plurality of pixels in each sub-image;
   determining a transfer-function correction matrix to produce a uniform intensity response across each of said plurality of pixels; and
   applying said transfer-function correction matrix to remove intensity distortion from measurement sub-images produced by the system.

21. A method of correcting measurement data obtained from a multi-channel imaging system, comprising the steps of:
   producing a sub-image in each channel of the system using a predetermined wavelength;
   measuring an intensity distortion introduced by the system in a plurality of pixels in each sub-image;

determining a transfer-function correction matrix to produce a uniform intensity response across each of said plurality of pixels; and applying said transfer-function correction matrix to remove intensity distortion from measurement sub-images produced by the system.

22. A method of correcting measurement data obtained from a multi-channel imaging system, comprising the steps of:

a) producing a sub-image in each channel of the system using a predetermined wavelength;

b) dividing each sub-image produced by the system into a plurality of sub-regions;

c) measuring an intensity distortion introduced by the system in a plurality of pixels in each sub-region of said sub-image;

d) determining a transfer-function correction matrix to produce a uniform intensity response across each of said plurality of pixels in each sub-region of said sub-image; and e) applying said transfer-function correction matrix to remove intensity distortion from measurement sub-images produced by the system.

* * * * *

UNITED STATES PATENT AND TRADEMARK OFFICE
CERTIFICATE OF CORRECTION

PATENT NO. : 7,079,251 B2
APPLICATION NO. : 10/687308
DATED : July 18, 2006
INVENTOR(S) : Millerd et al.

It is certified that error appears in the above-identified patent and that said Letters Patent is hereby corrected as shown below:

Column 13, line 4, cancel the text "8. The system of claim 4," and insert the following text: --9. The system of claim 8,--;

Column 13, line 17, cancel the text "9. The system of claim 8," and insert the following text: --10. The system of claim 9,--;

Column 13, line 25, cancel the text "10. The system of claim 4," and insert the following text: --11. The system of claim 8,--;

Column 13, line 31, renumber the claim from "12" to --8--;

Column 13, line 46, the word "imagine" should be changed to --imaging--;

Column 14, line 1, the word "sub-images" should be changed to --sub-image--.

Signed and Sealed this

Nineteenth Day of December, 2006

JON W. DUDAS
*Director of the United States Patent and Trademark Office*